(12) United States Patent
Brown (10) Patent No.: US 8,599,515 B2
(45) Date of Patent: Dec. 3, 2013

(54) MAGNETIC STORAGE DEVICE WITH DUAL STAGE HUMIDITY CONTROL

(75) Inventor: Charles Allan Brown, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 134 days.

(21) Appl. No.: 13/291,941

(22) Filed: Nov. 8, 2011

(65) Prior Publication Data

US 2013/0114163 A1   May 9, 2013

(51) Int. Cl.
*G11B 33/14*   (2006.01)

(52) U.S. Cl.
USPC .................................. 360/97.16; 360/97.13

(58) Field of Classification Search
USPC ................................ 360/97.12, 97.13, 97.16
See application file for complete search history.

(56) References Cited

U.S. PATENT DOCUMENTS

| | | | |
|---|---|---|---|
| 4,620,248 A | 10/1986 | Gitzendanner | |
| 4,831,475 A | 5/1989 | Kakuda et al. | |
| 4,967,295 A | 10/1990 | Yamauchi et al. | |
| 5,075,807 A | 12/1991 | Inoue et al. | |
| 5,293,286 A | 3/1994 | Hasegawa et al. | |
| 6,453,679 B1 | 9/2002 | Aoyagi et al. | |
| 6,735,044 B2 | 5/2004 | Tomioka | |
| 7,420,773 B2 | 9/2008 | Hatanaka | |
| 7,688,543 B2 | 3/2010 | Lee et al. | |
| 7,695,547 B2 * | 4/2010 | Smith | 95/117 |
| 7,719,792 B2 | 5/2010 | Strom et al. | |
| 2004/0258859 A1 * | 12/2004 | Acevedo et al. | 428/34 |
| 2007/0160789 A1 * | 7/2007 | Merical et al. | 428/35.7 |
| 2008/0165447 A1 * | 7/2008 | Lee et al. | 360/97.02 |
| 2008/0180835 A1 | 7/2008 | Strom et al. | |
| 2009/0188386 A1 | 7/2009 | Beatty et al. | |
| 2011/0056951 A1 * | 3/2011 | Wooldridge | 220/495.01 |
| 2011/0141628 A1 * | 6/2011 | Brown | 360/246.2 |
| 2013/0044391 A1 * | 2/2013 | Brown | 360/97.16 |
| 2013/0044392 A1 * | 2/2013 | Brown | 360/97.16 |
| 2013/0044393 A1 * | 2/2013 | Brown et al. | 360/97.16 |

OTHER PUBLICATIONS

"Data Clinic Knowledgebase: Data Recovery and Hard Disk Reference Section", www.datasclinic.co.uk, 8 pages, Feb. 15, 2011.
W.L. Gore & Associates, Inc., "Disk Drive Filters", 2 pages, 2006.
W.L. Gore & Associates, Inc., "Gore Adsorbent Breather", 1 pages, Feb. 2011.
W.L. Gore & Associates, Inc., "Gore Adsorbent Assembly", 1 pages, 2011.
W.L. Gore & Associates, Inc., "Gore Adsorbent Box", 1 pages, Feb. 2011.

\* cited by examiner

*Primary Examiner* — Jefferson Evans
(74) *Attorney, Agent, or Firm* — Brokaw Patent Law PC; Christopher J. Brokaw (57) ABSTRACT

Approaches for desiccant device having a dual stage humidity control for use within sensitive electronic equipment. Electronic equipment, such as a hard-disk drive (HDD), may comprise a desiccant device that comprises a first absorbing portion that comprises a first desiccant material and a second absorbing portion that comprises a second desiccant material. The first absorbing portion possesses a relatively rapid permeation rate for water vapor, while the second absorbing portion possesses a relatively low permeation rate for water vapor. The first desiccant material may have a relatively high rate of water vapor absorption, while the second desiccant material may have a relatively low rate of water vapor absorption. In this way, embodiments allow for the sensitive equipment to be dried out rapidly in manufacturing and yet have a slow reversible water absorption rate during operation.

25 Claims, 6 Drawing Sheets

|  | Scenario A | Scenario B | Scenario C |
|---|---|---|---|
|  | Equilibrium water content if | | |
| Cleanroom humidity= | 55% | 55% | 70% |
| Desiccant humidity= | 55% | 10% | 70% |
| Part | Equil H2O content | | |
| Desiccant Device | 69.94 | 8.97 | 124.78 |
| Breather Filter | 4.23 | 4.23 | 14.28 |
| Air volume | 0.29 | 0.29 | 0.37 |
| Plastic parts | 13.44 | 13.44 | 17.11 |
| Sum | 87.9 | 26.9 | 156.5 |
| Drive RH= | 55% | 23% | 70% |

MAGNETIC STORAGE DEVICE WITH DUAL STAGE HUMIDITY CONTROL

RELATED APPLICATION DATA

This application is related to U.S. patent application Ser. No. 13/212,038, entitled "Magnetic Storage Device with Dynamic Humidity Control System to Mitigate Water Vapor Transients," invented by Charles Allan Brown et al., hereafter referred to as "the Brown patent application," filed on Aug. 17, 2011, the disclosure of which is incorporated by reference in its entirety for all purposes as if fully set forth herein.

This application is related to U.S. patent application Ser. No. 13/211,826, entitled "Magnetic Storage Device with Humidity Control Device Incorporating a Differentially Permeable Membrane," invented by Charles Allan Brown, filed on Aug. 17, 2011, the disclosure of which is incorporated by reference in its entirety for all purposes as if fully set forth herein.

This application is related to U.S. patent application Ser. No. 13/211,748, entitled "Magnetic Storage Device with Multi-Functional Component for Controlling Chemical and Water Vapor Therein," invented by Charles Allan Brown, filed on Aug. 17, 2011, the disclosure of which is incorporated by reference in its entirety for all purposes as if fully set forth herein.

FIELD OF THE INVENTION

Embodiments of the invention generally relate to a desiccant device, for use in a sensitive electronic device, having a dual stage humidity control.

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface. Because the read/write head flies so close to the surface of the magnetic-recording disk, the components within the HDD may be sensitive to moisture, contaminants, and other impurities and imperfections within the protective enclosure of the HDD.

Over time, the design HDD has evolved to accommodate lower and lower fly heights. As fly heights decrease, magnetic storage devices (such as HDDs) are at increased risk to experiencing harm from high internal water vapor concentration. High concentrations of water vapor can alter fly heights, increase error rates, and wear upon the magnetic-recording head. In addition, high concentration of water vapor can promote various undesirable processes such as corrosion. Desiccants may be used within electronic equipment (such as a HDD) to reduce concentrations of water vapor therein.

SUMMARY OF THE INVENTION

Elevated humidity with a hard-disk drive (HDD) can negatively impact reliability due to factors such as corrosion, lube mobility, and fly height. Desiccants have been used within HDDs to absorb humidity to reduce such negative effects. The moisture absorbed by the desiccant is primarily intended to be absorbed during storage of the HDD. However, moisture absorbed by the desiccant may be later released when the drive is in operation.

Prior art desiccants may hold the humidity within a HDD high for days or weeks. However, the ideal desiccant would absorb the water from the manufacturing process at a rapid rate, but then release the water no faster than the HDD itself can disperse it through the breather filter and gaskets to avoid a situation where the desiccant contributes to elevated humidity within the HDD. In view of this ideal, embodiments of the invention employ a desiccant device with a dual stage humidity control. Each of the two humidity controls of the desiccant device has different absorption rates, thereby allowing the HDD to be dried out rapidly in manufacturing and yet have a slow reversible water absorption rate during operation.

According to an embodiment, a HDD comprises an enclosure, a magnetic-recording head, a magnetic-recording disk rotatably mounted on a spindle, and a desiccant device comprising a first absorbing portion and a second absorbing portion. The first absorbing portion comprises a first desiccant material and the second absorbing portion comprises a second desiccant material that may be different than the first desiccant material. The first absorbing portion possesses a relatively rapid permeation rate for water vapor, while the second absorbing portion possesses a relatively low permeation rate for water vapor. In this way, during manufacturing the HDD may be quickly dried out by the desiccant device; however, during storage of the HDD, the water vapor may be prevented from being dispersed faster than desirable from the desiccant device. In certain embodiments, the first desiccant material may have a relatively high rate of water vapor absorption, while the second desiccant material may have a relatively low rate of water vapor absorption. Also, in certain embodiments, the first desiccant material may have a relatively high permeation rate for water vapor, while the second desiccant material may have a relatively low permeation rate for water vapor.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a desiccant device having a dual stage humidity control are described. Embodiments may be used to absorb water from the interior of electronic equipment, such as a hard-disk drive (HDD), at a rapid rate, while still providing a slow reversible water absorption rate. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Embodiments of the invention may be used to enable a desiccant device, used within sensitive electronic equipment such as a hard-disk drive (HDD), to absorb humidity within the interior of the sensitive electronic equipment at a rapid rate, while still providing a slow reversible water absorption rate, which will be beneficial during operation. For purposes of providing a concrete example, particular embodiments of the invention shall be described with reference to a hard-disk drive (HDD). However, desiccant devices according to embodiments of the invention may be used within the interior of many types of electronic equipment. Consequently, embodiments of the invention need not be limited to use within a HDD, since embodiments of the invention have broader applicability.

Figure 1:
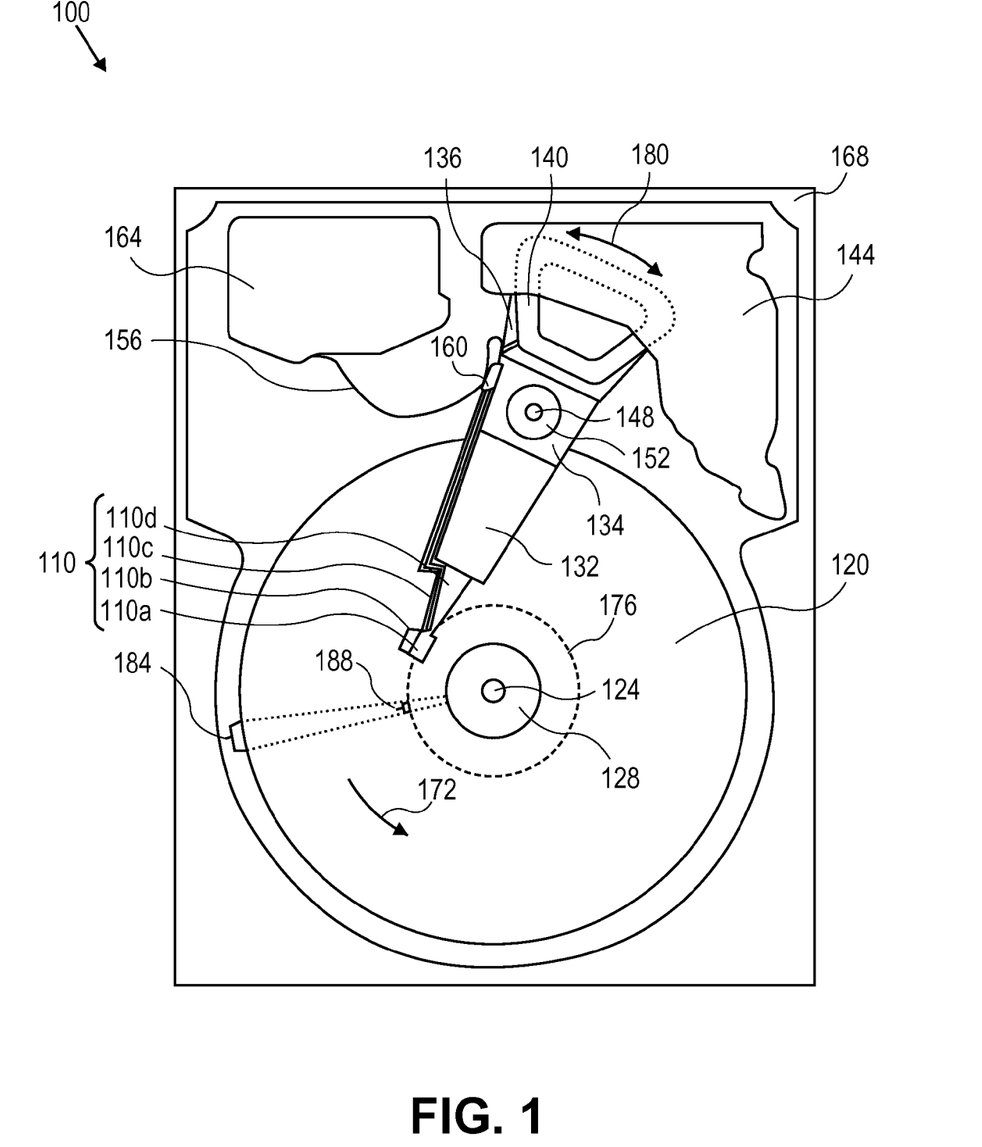
FIG. 1 is a plan view of an HDD according to an embodiment of the invention.

In accordance with an embodiment of the invention, a plan view of a HDD 100 is shown in FIG. 1. FIG. 1 illustrates the functional arrangement of components of the HDD including a slider 110b that includes a magnetic-recording head 110a. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a.

Figure 2:
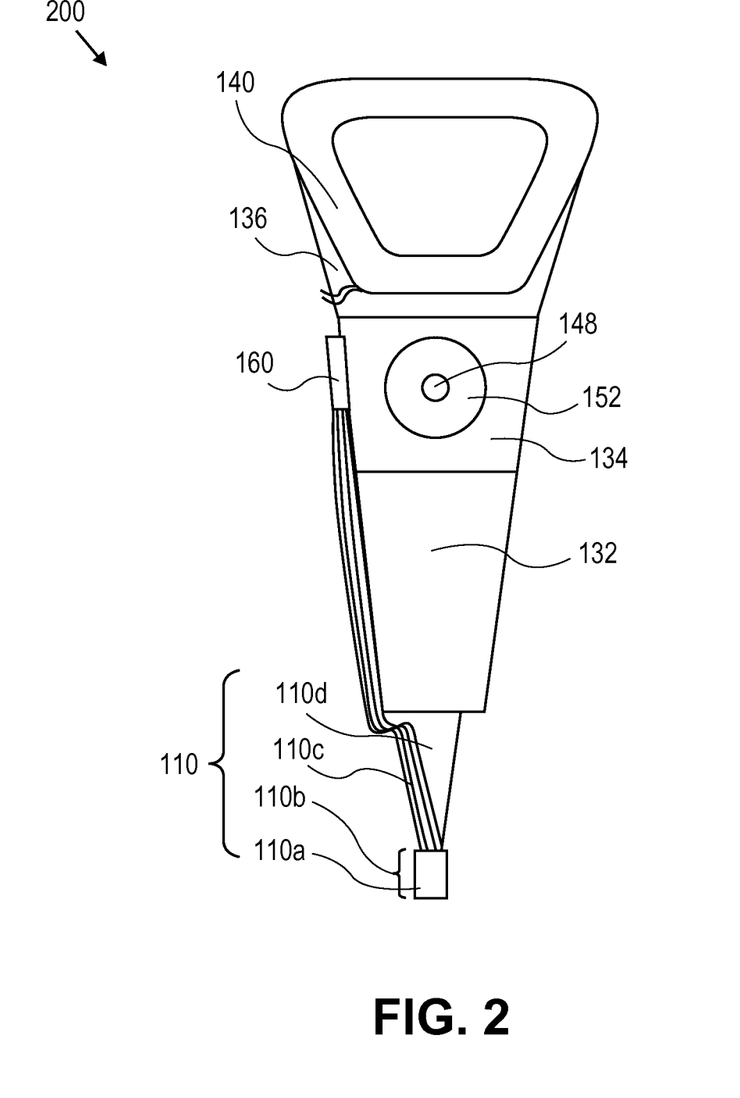
FIG. 2 is a plan view of a head-arm-assembly (HAA) according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Functional Overview

As shall be elaborated upon below, water vapor is typically introduced in greater concentration during manufacturing of a HDD than during storage or operation of the HDD. Therefore, it would be advantageous for a desiccant device to absorb water from the interior of the HDD during the manufacturing process at a rapid rate, but then release water vapor no faster than the HDD can disperse the water vapor through the breather filter and gaskets during storage and operation of the HDD. In recognition of this benefit, embodiments employ a desiccant device having a dual stage humidity control that allows a HDD to be dried out rapidly in manufacturing and yet have slow reversible water absorption during storage and operation.

In an embodiment, a desiccant device comprises at least two absorbing portions. Each absorbing portion possesses different absorbing characteristics. For example, a first absorbing portion may possess a relatively rapid permeation rate for water vapor, while a second absorbing portion may possess a relatively low permeation rate for water vapor. The absorbing portions may also comprise different desiccant materials that possess different qualities, e.g., the desiccant materials may have different rates of water absorption or water permeation. In this way, a first absorbing portion of the desiccant device may be designed to absorb moisture immediately after the HDD is assembled and lower the humidity to typical operating levels, even before post assembly manufacturing processing occurs. The second absorbing portion of the descant device may be designed to control humidity during storage and operation of the HDD.

How Humidity May be Introduced within a HDD

During the manufacturing process, a HDD may be assembled with parts that are washed and/or stored at cleanroom humidity, which is typically around 55-60%. These parts of the HDD may subsequently become equilibrated at this rate of humidity and serve as buffers to maintain high humidity or as a contributing source of water within the HDD. A function of the desiccant device is to remove this excess humidity before the HDD enters the post assembly manufacturing and test environment.

Figure 3:
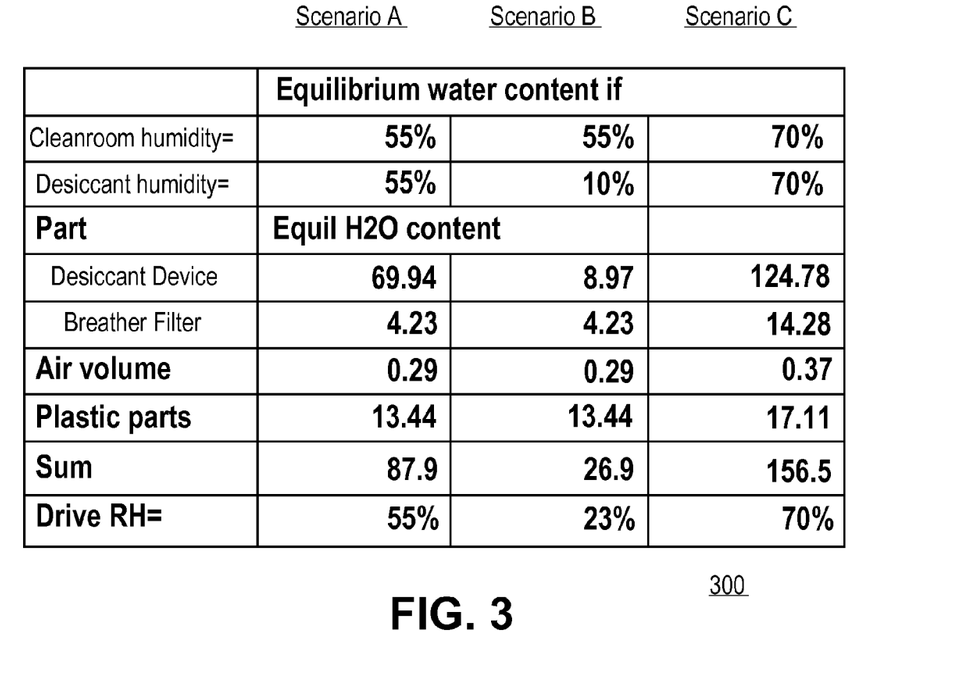
FIG. 3 is a table that depicts moisture content data for various scenarios involving a small form factor HDD.

FIG. 3 is a table 300 that depicts moisture content data for various scenarios involving a small form factor HDD. Scenario A of table 300 represents an example where all parts of the HDD, including the desiccant device, are at cleanroom humidity when installed. Scenario B represents an example where the HDD is at cleanroom humidity and the desiccant device is installed in a relatively dry state. Scenario C represents an example where the HDD, including the desiccant device, has been stored in a relatively humid environment, such as 30° C. and 90% humidity, non-condensing.

Most parts of a HDD are constructed out of metal, and even with an ecoat, do not hold significant amounts of water. However, the carbon of breather filters as well as chemical absorbers, plastic structural components, and elastomeric seals all absorb relatively large amounts of water. This is in addition to the potential for liquid water to be carried along with parts which are washed during the manufacturing process. Such water may not be fully evaporated during the limited time for 'drying' that follows the wash.

It is apparent from FIG. 3 that in any scenario there is a large stock of water absorbed into various parts of the HDD. Even in scenario B, where the desiccant device is installed near the limit of practical humidity, the amount of water within the HDD is significant. In scenarios A and C there is an abundant stock of water to keep the humidity in the HDD high after the HDD is put into operation.

Figure 4:
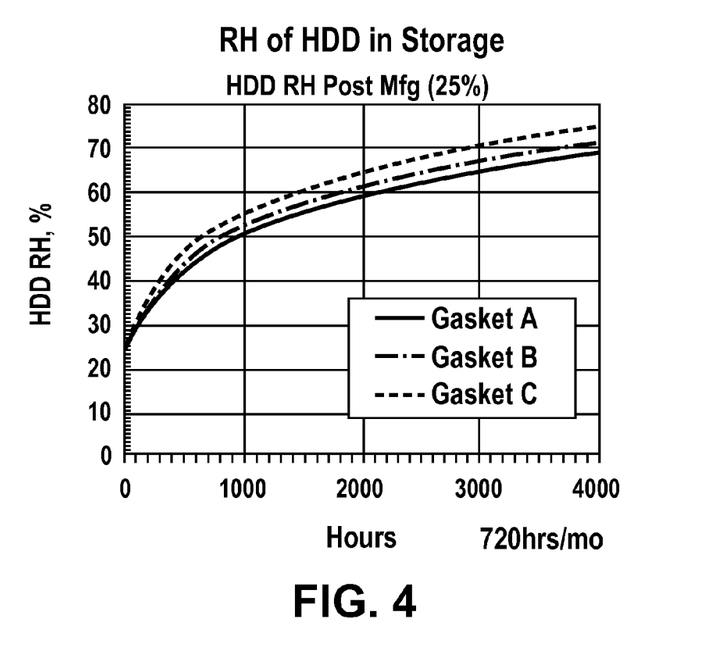
FIG. 4 is a graph depicting the rate at which the moisture penetrates and the humidity rises in a HDD using a conventional desiccant device across three types of gaskets.

FIG. 4 is a graph depicting the rate at which the moisture penetrates and the humidity rises in a HDD using a conventional desiccant device across three types of gaskets. Gasket C represents a commonly used current gasket, while gaskets A and B represent possible moisture resistant gaskets. The X-axis represents the amount of time a HDD is maintained in storage, while the Y-axis represents the relative humidity of the HDD. As depicted in FIG. 4, after a HDD is maintained in storage for about 5.5 months (roughly 4000 hours), relative humidities of 74%, 71%, and 68% are realized by a HDD employing gaskets A, B, and C respectively. What is noteworthy is that certain internal components of HDD may act as a water source, thereby causing the HDD to dry out slowly. Eliminating the desiccant device will cause the humidity to rise much faster within the HDD, so that in approximately a month of storage the drive will be at equilibrium with a humid external environment.

Figure 5:
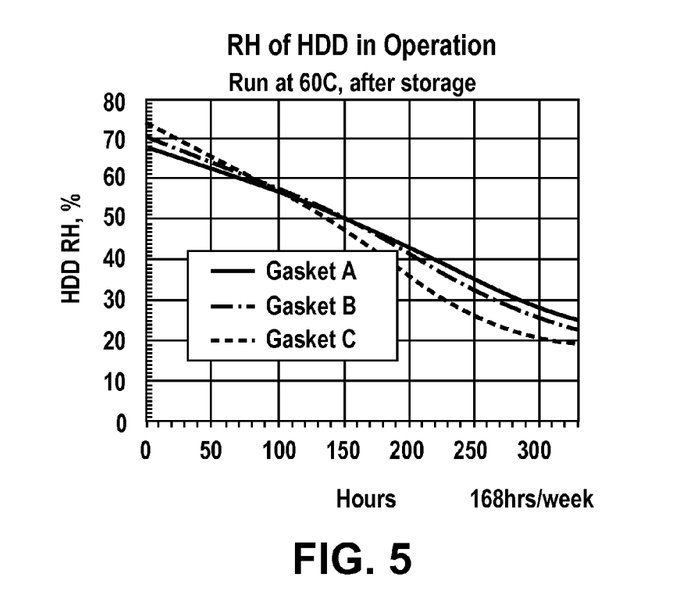
FIG. 5 is a graph depicting characteristics of the same HDDs as depicted in FIG. 4 after the HDDs have been placed in operation at 60° C. and in a moderately controlled environment.

FIG. 5 is a graph depicting characteristics of the same HDDs as depicted in FIG. 4 after the HDDs have been placed in operation at 60° C. and in a moderately controlled environment. As can be seen in FIG. 5, relative humidity within the HDD will tend to decrease over time. This phenomenon is to be expected, as the humidity within the HDD will eventually equilibrate with the humidity of the external environment.

Figure 6A:
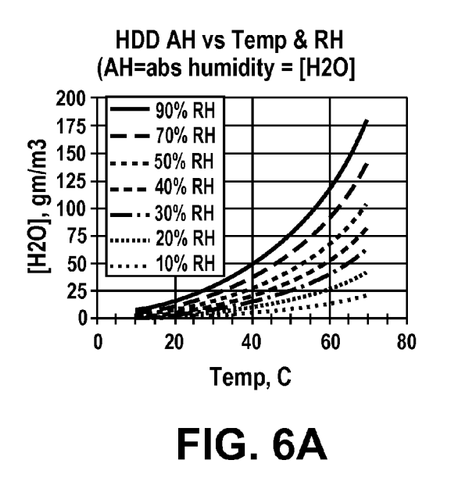
FIGS. 6A and 6B are graphs that depict the relationship between absolute and relative humidity vs. temperature.
Figure 6B:
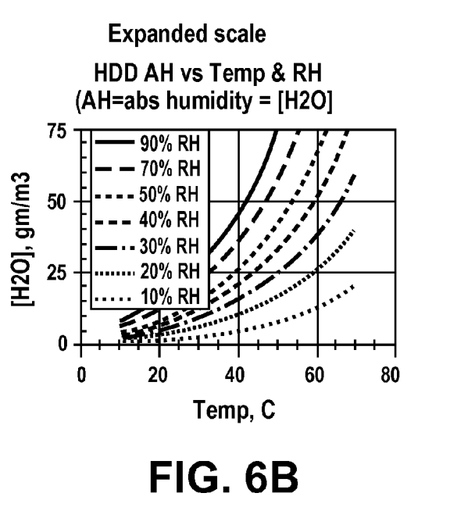

FIGS. 6A and 6B are graphs that depict the relationship between absolute and relative humidity vs. temperature. When a HDD is assembled, even a moderate amount of contained moisture may have a deleterious effect in downstream manufacturing and test processes. An absolute humidity of 25 g/m3 may be problematic, while an absolute humidity of 50 g/m3 are to be avoided. The inventor notes that relative humidity (RH) may not adequately define the problem. Although corrosion may be said to be related to relative humidity rather than absolute humidity (AH, or H20), other factors such as changes in fly height and lube mobility appear to be related to absolute humidity. Other problems suffered at the head disk interface (HDI) may also be due to absolute humidity rather than relative humidity.

Implementing a Desiccant Device Having a Dual Stage Humidity Control

As explained above, it is advantageous to lower the humidity within a HDD rapidly (particularly during assembly of the HDD) and to limit the ability of moisture to desorb into the HDD from the desiccant device (for example, during elevated temperature processes and tests and/or storage of the HDD). Therefore, a desiccant device according to an embodiment may comprise a dual stage humidity control. The dual stage humidity control may be implemented by a structure that supports two absorbing portions. A first absorbing portion may be implemented by a desiccant material having a relatively high rate of water absorption enclosed in a relatively highly water permeable material, and a second absorbing portion may be implemented by a desiccant material having a relatively lower rate of water absorption enclosed in a relatively poor water permeable material. In this way, the dual stage humidity control may quickly absorb water but be slow to release water.

Figure 7:
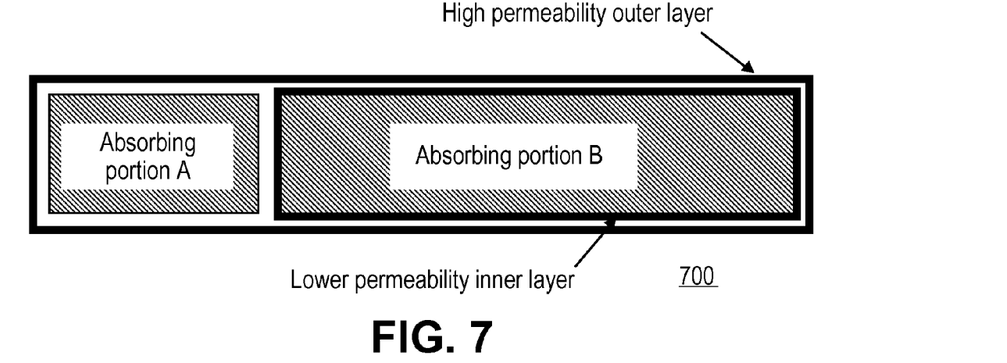
FIG. 7 is an illustration of a desiccant device having a dual stage humidity control according to an embodiment of the invention.

An illustrative desiccant device having a dual stage humidity control according to an embodiment is depicted in the illustration of FIG. 7. Desiccant device 700 may implement a dual stage humidity control by comprising absorbing portion A and absorbing portion B. As depicted in FIG. 7, absorbing portion A may possess a relatively rapid permeation rate for water vapor, while absorbing portion B may possess a relatively low permeation rate for water vapor.

In an embodiment, each of absorbing portion A and absorbing portion B may be implemented by a desiccant material that may be, but need not, comprised with an enclosure or container that is partially or wholly water permeable. Absorbing portion A may comprise a different desiccant material than absorbing portion B. For example, absorbing portion A shall be said to include desiccant material A, while absorbing portion B shall be said to include desiccant material B. According to one embodiment, desiccant material A may have a relatively high rate of water vapor absorption, while desiccant material B may have a relatively low rate of water vapor absorption. In another embodiment, desiccant material A may have a relatively high permeation rate for water vapor, while desiccant material B may have a relatively low permeation rate for water vapor.

In another embodiment, absorbing portion A and absorbing portion B may be implemented such that the desiccant material comprised therein is not comprised with an enclosure or container. Instead, the desiccant material may be directly exposed to the gaseous environment of the HDD. For example, if the desiccant material is a solid material or otherwise having a structure that allows it to be confined to an area, then it may not be necessary to enclose the desiccant material in an enclosure or container. Note that it may be necessary for desiccant materials used in this embodiment to be formulated to meet the stringent particle requirements of the interior of a disk drive.

Desiccant material A may be embodied by a variety of different desiccant materials, such as activated alumina or alumino silicates, activated alumina in combination with water reactive chemicals, alumino-silicates (either calcined or uncalcined) in combination with water reactive chemicals, and diatomaceous earth or other inert absorptive materials in combination with water reactive chemicals. Other examples of desiccant material A include three dimensional organic or inorganic structures having regular pores, with a pore size of less than 0.4 nm or with a pore size between 0.4 nm and 10 nm. Other examples of desiccant material A include silica gel with a pore structure greater than 15 nm in combination with water reactive chemicals, silica gel with a pore structure between 9 and 15 nm in combination with water reactive chemicals, and other high surface area materials, such as activated carbon, in combination with water reactive chemicals.

Desiccant material B may also be embodied by a variety different desiccant materials, such as silica gel with a pore size of (a) less than or equal to 2.5 nm, (b) between 2 and 7.5 nm, or (c) between 7.5 and 15 nm. Other examples of desiccant material B include activated carbon with pore distributions that are either (a) biased toward micropores or (b) distributed between micro and mesopores. Other examples of desiccant material B include (a) polymer gels or porous structures capable of absorbing water, alone or in combination with other absorbers, and (b) materials that absorb water as hydrates but are capable of releasing the water upon heating to a high HDD operation temperature, e.g., sodium sulfate.

Desiccant device 700 of FIG. 7 may be distinguishable over certain prior desiccant devices due to its use of different desiccant materials having different characteristics regarding water permeation and/or water absorption. Many prior desiccant devices employ a single type absorbing material having relatively low absorption energy and allowing rapid permeation of water vapor.

The high energy of absorption of absorbing portion A renders absorbing portion A relatively immune, in the thermal operating envelope of the HDD, to desorption and the release of water vapor to raise the absolute humidity. However, absorbing portion A may be structured so that if water vapor passes relatively easily into absorbing portion A via its high permeability outer layer.

In contrast, the lower permeability layer surrounding absorbing portion B may restrict the transmission of water therein in accordance with the teachings of U.S. patent application Ser. No. 13/212,038 or U.S. patent application Ser. No. 13/211,826, both of which are incorporated by reference for all purposes as if fully set forth herein.

Figure 8:
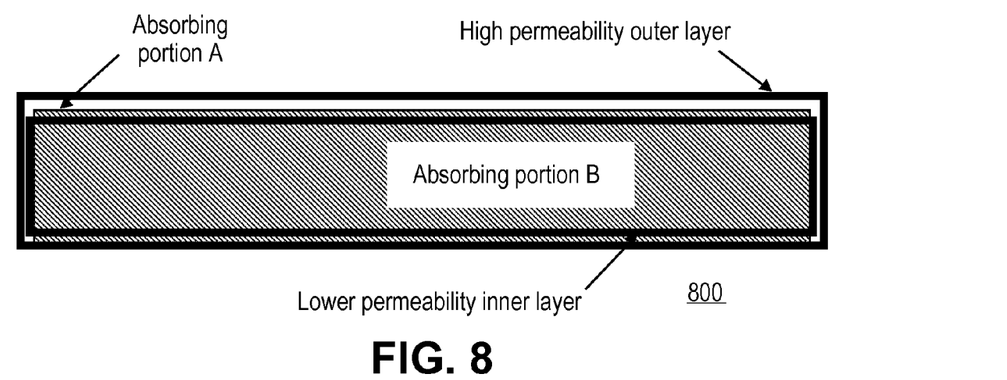
FIG. 8 is an illustration of another desiccant device having a dual stage humidity control according to an embodiment of the invention.

FIG. 8 is an illustration of another desiccant device 800 having a dual stage humidity control according to an embodiment of the invention. FIG. 8 shows desiccant device 800 having a layer of porous material with absorbing portion B embedded therein. While not depicted in FIG. 8, absorbing portion B may be embedded in multiple layers of porous material in certain embodiments. Non-limiting, illustrative examples of such porous material include non-woven fabric layered on one or more sides of absorbing portion B. Absorbing portion A and absorbing portion B may be arranged as layers in a plurality of layers within desiccant device 800.

Figure 9:
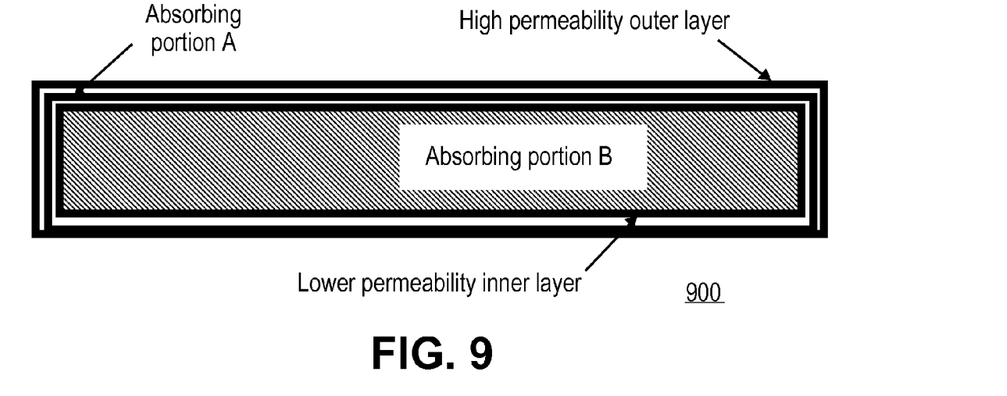
FIG. 9 is an illustration of another desiccant device having a dual stage humidity control according to an embodiment of the invention.

FIG. 9 is an illustration of another desiccant device 900 having a dual stage humidity control according to an embodiment of the invention. FIG. 9 shows desiccant device 900 having an absorbing portion B enclosed within absorbing portion A. For example, absorbing portion A may be implemented as a film wrapper acting as a high energy absorber which fully encases absorbing portion B. Absorbing portion B may also be mixed within absorbing portion A, e.g., absorbers may be mixed into a polymer, such as a plastic structure.

Figure 10A:
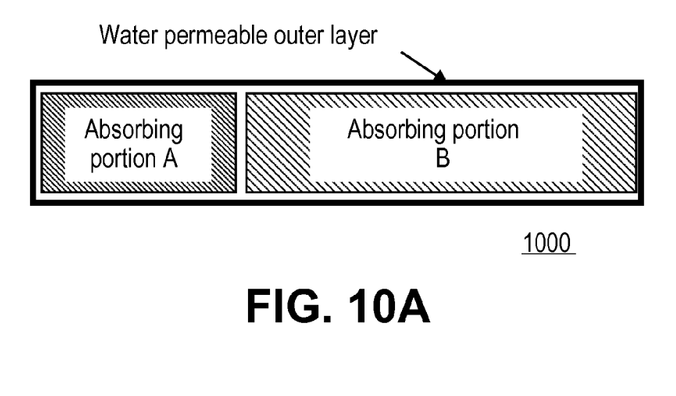
FIGS. 10A and 10B depict desiccant devices according to other embodiments of the invention.
Figure 10B:
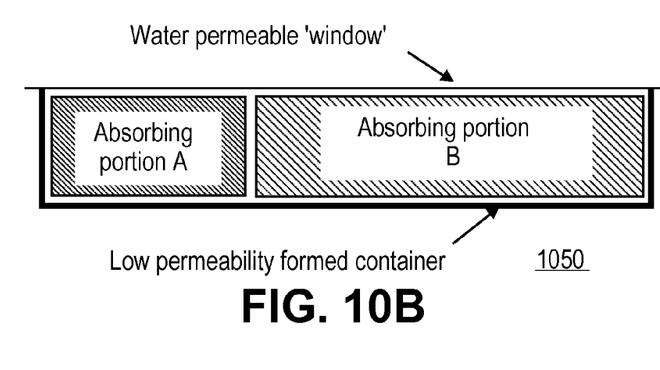

FIGS. 10A and 10B depict desiccant devices according to other embodiments of the invention. Desiccant device 1000 and 1050 each depict absorbing portion A and absorbing portion B as not being coextensive. Desiccant device 1000 is constructed such that its entire exterior is water permeable, while desiccant device 1050 is constructed such that the majority of the exterior of the desiccant device 1050 is a low water permeability formed container, while a minority portion (such as a lid or cover) of desiccant device is water permeable.

Desiccant device 1000 and 1050 may be implemented as formed composites of the desiccant material with formed solid shapes. The water vapor permeability of a particular portion may be determined by the composition of the desiccant material and a matrix or binder. Desiccant device 1000 is depicted as having a flexible outer wrapper while desiccant device 1050 is depicted as comprising two solid desiccant materials, placed in a formed or molded shape, having a high permeability "window" or portion of the exterior surface.

As shown in FIGS. 10A and 10B, permeation of water vapor may be controlled by the structure and composition of molded shapes. For example, if a desiccant material is mixed with a material such as a binder, thereby leaving significant open voids in the solid, then the moisture permeation will be rapid. However, if the desiccant material is embedded in a material, such as thermoplastic, that effectively removes most or all of the voids in the composite, then the moisture permeation will be slow.

Figure 11:
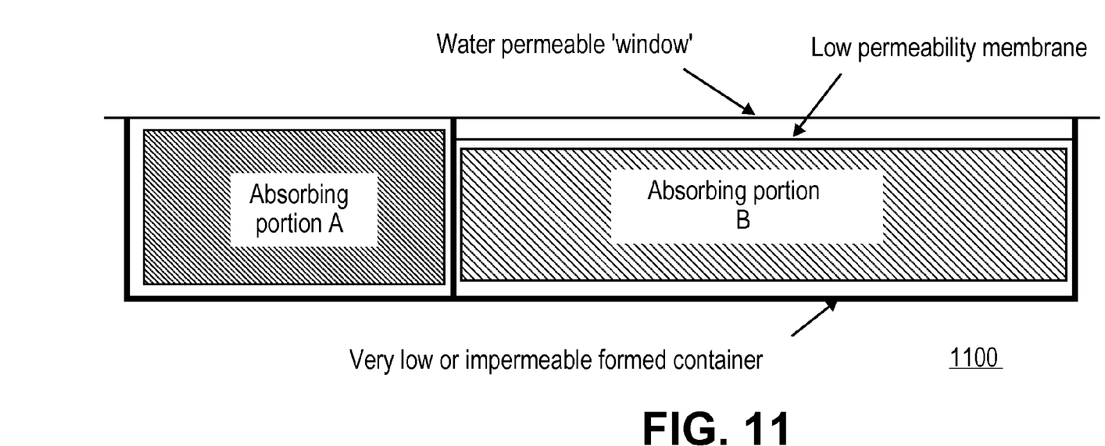
FIG. 11 depicts a desiccant device according to another embodiment of the invention.

FIG. 11 depicts a desiccant device 1100 according to another embodiment of the invention. Desiccant device 1100 comprises two desiccant materials that are segregated into separate parts of a formed or molded shape. Absorbing portion B is separated from the surrounding gas within the interior of the HDD by a low permeability firm or membrane. As shown in FIG. 11, a majority of the surface of absorbing portion A and absorbing portion B may be substantially water impermeable.

While embodiments of the invention have chiefly been discussed herein as having two separate absorbing portions, embodiments of the invention may have any number of absorbing portions. For example, a desiccant device of an embodiment may have three absorbing portions that each have a different water permeation rate and/or rate of water absorption.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
   an enclosure;
   a magnetic-recording head;
   a magnetic-recording disk rotatably mounted on a spindle; and
   a desiccant device comprising a first absorbing portion and a second absorbing portion,
   wherein the first absorbing portion comprises a first desiccant material, wherein the second absorbing portion comprises a second desiccant material, wherein the first desiccant material is different than the second desiccant material,
   wherein the first absorbing portion possesses a relatively rapid permeation rate for water vapor, and wherein the second absorbing portion possesses a relatively low permeation rate for water vapor,
   wherein the second absorbing portion is enclosed within the first absorbing portion.

2. The hard-disk drive of claim 1, wherein the first desiccant material has a relatively high rate of water vapor absorption, and wherein the second desiccant material has a relatively low rate of water vapor absorption.

3. The hard-disk drive of claim 1, wherein the first desiccant material has a relatively high permeation rate for water vapor, and wherein the second desiccant material has a relatively low permeation rate for water vapor.

4. The hard-disk drive of claim 1, wherein the second desiccant material is intermixed with a substance with restricts the transmission of water.

5. The hard-disk drive of claim 1, wherein the first absorbing portion and the second absorbing portion are each layers in a plurality of layers that are arranged within the desiccant device.

6. The hard-disk drive of claim 1, wherein a majority of the surface of each of the first absorbing portion and the second absorbing portion is substantially water impermeable.

7. The hard-disk drive of claim 1, wherein either the first desiccant material or the second desiccant material is mixed within a polymer or plastic material to form a solid.

8. The hard-disk drive of claim 1, wherein the first desiccant material possesses pores of relatively small size, and wherein the second desiccant material possesses pores of relatively large size.

9. The hard-disk drive of claim 1, wherein the first desiccant material is intermixed with a polymer matrix, and wherein the first desiccant material possesses a relatively small number of pores and a relatively high diffusion rate through the polymer matrix.

10. A desiccant device for use in an enclosure protecting sensitive electronic equipment, comprising:
    a first absorbing portion; and
    a second absorbing portion,
    wherein the first absorbing portion comprises a first desiccant material, wherein the second absorbing portion comprises a second desiccant material, wherein the first desiccant material is different than the second desiccant material,
    wherein the first absorbing portion possesses a relatively rapid permeation rate for water vapor, and wherein the second absorbing portion possesses a relatively low permeation rate for water vapor,
    wherein the second absorbing portion is enclosed within the first absorbing portion.

11. The desiccant device of claim 10, wherein the first desiccant material has a relatively high rate of water vapor absorption, and wherein the second desiccant material has a relatively low rate of water vapor absorption.

12. The desiccant device of claim 10, wherein the first desiccant material has a relatively high permeation rate for water vapor, and wherein the second desiccant material has a relatively low permeation rate for water vapor.

13. The desiccant device of claim 10, wherein the second desiccant material is intermixed with a substance with restricts the transmission of water.

14. The desiccant device of claim 10, wherein the first absorbing portion and the second absorbing portion are each layers in a plurality of layers that are arranged within the desiccant device.

15. The desiccant device of claim 10, wherein a majority of the surface of each of the first absorbing portion and the second absorbing portion is substantially water impermeable.

16. The desiccant device of claim 10, wherein either the first desiccant material or the second desiccant material is mixed within a polymer or plastic material to form a solid.

17. The desiccant device of claim 10, wherein the first desiccant material possesses pores of relatively small size, and wherein the second desiccant material possesses pores of relatively large size.

18. The desiccant device of claim 10, wherein the first desiccant material is intermixed with a polymer matrix, and wherein the first desiccant material possesses a relatively small number of pores and a relatively high diffusion rate through the polymer matrix.

19. A desiccant device for use in a hard-disk drive, comprising:
- a first absorbing portion comprising a first desiccant material; and
- a second absorbing portion comprising a second desiccant material,
- wherein the first absorbing portion possesses a relatively rapid permeation rate for water vapor, wherein the second absorbing portion possesses a relatively low permeation rate for water vapor,
- wherein the first desiccant material has a relatively high rate of water vapor absorption, and wherein the second desiccant material has a relatively low rate of water vapor absorption,
- wherein the second absorbing portion is enclosed within the first absorbing portion.

20. A hard-disk drive, comprising:
- an enclosure;
- a magnetic-recording head;
- a magnetic-recording disk rotatably mounted on a spindle; and
- a desiccant device comprising a first absorbing portion and a second absorbing portion,
- wherein the first absorbing portion comprises a first desiccant material, wherein the second absorbing portion comprises a second desiccant material, wherein the first desiccant material is different than the second desiccant material,
- wherein the first absorbing portion possesses a relatively rapid permeation rate for water vapor, and wherein the second absorbing portion possesses a relatively low permeation rate for water vapor,
- wherein the first desiccant material and the second desiccant material are both exposed directly to the gas within the interior of the hard-disk drive.

21. The hard-disk drive of claim 20, wherein the first desiccant material possesses pores of relatively small size, and wherein the second desiccant material possesses pores of relatively large size.

22. The hard-disk drive of claim 20, wherein the second desiccant material is intermixed with a substance with restricts the transmission of water.

23. A desiccant device for use in an enclosure protecting sensitive electronic equipment, comprising:
- a first absorbing portion; and
- a second absorbing portion,
- wherein the first absorbing portion comprises a first desiccant material, wherein the second absorbing portion comprises a second desiccant material, wherein the first desiccant material is different than the second desiccant material,
- wherein the first absorbing portion possesses a relatively rapid permeation rate for water vapor, and wherein the second absorbing portion possesses a relatively low permeation rate for water vapor,
- wherein the first desiccant material and the second desiccant material are both exposed directly to the gas within the interior of the hard-disk drive.

24. The desiccant device of claim 23, wherein the first desiccant material possesses pores of relatively small size, and wherein the second desiccant material possesses pores of relatively large size.

25. The desiccant device of claim 23, wherein the second desiccant material is intermixed with a substance with restricts the transmission of water.

* * * * *